(12) United States Patent
Kilic et al.

(10) Patent No.: US 10,852,032 B2
(45) Date of Patent: Dec. 1, 2020

(54) HEAT EXCHANGER

(71) Applicants: DAIKIN INDUSTRIES, LTD., Osaka (JP); DAIKIN EUROPE N.V., Ostend (BE)

(72) Inventors: Serhan M Kilic, Hendek (TR); Hakan Peker, Hendek (TR); Aydin Tuna, Hendek (TR)

(73) Assignees: Daikin Industries, Ltd., Osaka (JP); Daikin Europe N.V., Ostend (BE)

( * ) Notice: Subject to any disclaimer, the term of this patent is extended or adjusted under 35 U.S.C. 154(b) by 166 days.

(21) Appl. No.: 15/778,500

(22) PCT Filed: Nov. 22, 2016

(86) PCT No.: PCT/JP2016/084574
§ 371 (c)(1),
(2) Date: May 23, 2018

(87) PCT Pub. No.: WO2017/090594
PCT Pub. Date: Jun. 1, 2017

(65) Prior Publication Data
US 2018/0347854 A1     Dec. 6, 2018

(30) Foreign Application Priority Data

Nov. 25, 2015   (EP) .................................... 15196280

(51) Int. Cl.
*F22B 23/06*      (2006.01)
*F24H 1/12*       (2006.01)
(Continued)

(52) U.S. Cl.
CPC .............. *F24H 1/124* (2013.01); *F24H 1/12* (2013.01); *F24H 1/24* (2013.01); *F24H 1/34* (2013.01);
(Continued)

(58) Field of Classification Search
CPC ... F22B 23/06; F24H 1/12; F24H 1/24; F24H 1/34; F24H 8/00; F24H 9/00
USPC ............................................ 122/367.1–367.3
See application file for complete search history.

(56) References Cited

U.S. PATENT DOCUMENTS

| 2,225,606 A | * | 12/1940 | Beauvais | ................. | F24H 1/18 |
| | | | | | 122/161 |
| 3,732,850 A | * | 5/1973 | Coley | ...................... | F22B 9/04 |
| | | | | | 122/367.3 |

(Continued)

FOREIGN PATENT DOCUMENTS

| EP | 1 722 172 A1 | 11/2006 | | |
| WO | WO-2019168481 A1 | * 9/2019 | ............... | F28F 1/34 |

OTHER PUBLICATIONS

International Preliminary Report of corresponding PCT Application No. PCT/JP2015/084574 dated Jun. 7, 2018.
(Continued)

*Primary Examiner* — Gregory A Wilson
(74) *Attorney, Agent, or Firm* — Global IP Counselors, LLP (57) ABSTRACT

A heat exchanger includes front and back walls forming a flue gas space such that a fluid flowing through a channel formed in the front and back walls can exchange heat with flue gas in the flue gas space, in use. The front wall includes a lower portion extending along the back wall, and an upper portion extending upwardly from an upper end of the lower portion and outwardly away from the back wall to form a combustion space of a flammable gas between the upper portion and the back wall. A length of the upper portion along a longitudinal direction thereof is longer than a length of the lower portion along a longitudinal direction thereof.

9 Claims, 9 Drawing Sheets

(51) Int. Cl.
*F24H 1/24* (2006.01)
*F24H 1/34* (2006.01)
*F28F 7/02* (2006.01)
*F24H 9/00* (2006.01)
*F24H 8/00* (2006.01)
*F28D 1/06* (2006.01)
*F28D 21/00* (2006.01)

(52) U.S. Cl.
CPC ............ *F24H 8/006* (2013.01); *F24H 9/0015* (2013.01); *F28F 7/02* (2013.01); *F28D 1/06* (2013.01); *F28D 2021/0024* (2013.01); *F28F 2215/00* (2013.01); *F28F 2255/14* (2013.01)

(56) References Cited

U.S. PATENT DOCUMENTS

| | | | | |
|---|---|---|---|---|
| 3,857,367 A * | 12/1974 | Giesen | ...................... | F24H 1/38 122/367.1 |
| 4,282,833 A * | 8/1981 | Giesen | ...................... | F24H 1/32 122/158 |
| 4,356,794 A * | 11/1982 | Bouman | ................... | F24H 1/32 122/158 |
| 4,852,523 A * | 8/1989 | Zeimes | ................... | F24H 1/287 122/18.1 |
| 7,784,434 B2 * | 8/2010 | Gelderloos | ........... | F24H 9/0026 122/367.1 |
| 8,726,851 B2 * | 5/2014 | Geelen | ...................... | F23C 3/00 122/116 |
| 2010/0242863 A1 * | 9/2010 | Hubau | ............... | B22D 19/0063 122/367.1 |
| 2012/0090563 A1 * | 4/2012 | Thijssen | ................. | B22C 7/065 122/367.1 |

OTHER PUBLICATIONS

International Preliminary Report of corresponding PCT Application No. PCT/JP2016/084574 dated Jun. 7, 2018.
International Search Report of corresponding PCT Application No. PCT/JP2016/084574 dated Mar. 30, 2017.
European Search Report of corresponding EP Application No. 15 19 6280.0 dated Jun. 16, 2016.

* cited by examiner

HEAT EXCHANGER

CROSS-REFERENCE TO RELATED APPLICATIONS

This U.S. National stage application claims priority under 35 U.S.C. § 119(a) to European Patent Application No. 15196280.0, filed in EP on Nov. 25, 2015, the entire contents of which are hereby incorporated herein by reference.

BACKGROUND

Field of the Invention

The invention relates to a heat exchanger, especially a heat exchanger in which heat is transferred from a flue gas to a flowing liquid.

Background Information

Such a heat exchanger is known from EP 1 722 172 A1. This heat exchanger is provided with a front wall and a back wall. Each of the front wall and the back wall includes a long lower portion which extends along a vertical plane and a short upper portion which extends upwardly and outwardly along a plane tilted to the vertical plane. The upper portion is arranged above the lower portion so as to form a combustion space. A flue gas flows between the inner surface of the front wall and the inner surface of the back wall. Channels in which water flows are respectively formed in the front wall and the back wall. Water flowing in the channels exchanges heat with the flue gas flowing between the inner surface of the front wall and the inner surface of the back wall.

SUMMARY

Although the heat exchanger above improves efficiency in heating of flowing fluid, there is still some room for improvement regarding the downsizing of the heat exchange system equipped with a heat exchanger.

It is the object of the present invention to provide a heat exchanger which contributes to the miniaturization of the system equipped with the heat exchanger.

A first aspect of the present invention provides a heat exchanger comprising a front wall and a back wall to form a space for a flue gas such that a fluid flowing through a channel formed in the front wall and back wall can exchange heat with the flue gas, in use. The front wall includes a lower portion and an upper portion. The lower portion extends along the back wall. The upper portion extends upwardly from the upper end of the lower portion and extends outwardly away from the back wall so as to form a combustion space of a flammable gas between the upper portion and the back wall. The length of the upper portion along the longitudinal direction thereof is longer than the length of the lower portion along the longitudinal direction thereof.

When the upper portion is short, the upper portion tends to form a dead space under the upper portion in a housing accommodating a heat exchange system equipped with the heat exchanger.

With the above configuration, since the upper portion is longer than the lower portion, the space formed under the upper portion can be effectively used for arranging an element constituting the heat exchange system accommodated in the housing.

According to an aspect of the heat exchanger mentioned above, the entire back wall extends along the lower portion of the front wall.

With the above configuration, it is easy to downsize a heat exchange system equipped with the heat exchanger since the back wall straightly extends in the plane substantially parallel to the lower part of the front wall. Specifically, when arranging the heat exchanger on a horizontal plane, it is easy to downsize the heat exchange system equipped with the heat exchanger since the entire back wall extends along the vertical plane. For example, when putting the heat exchanger in a box-like-shaped housing for accommodating elements of the heat exchange system, a dead space between the back surface of the heat exchanger and the inner surface of the housing can be minimized.

According to another aspect of any one of the heat exchangers mentioned above, the upper portion of the front wall has a plane-like shape.

A heat exchanger with this configuration above is easy to manufacture.

According to another aspect of any one of the heat exchangers mentioned above, the lower portion of the front wall has a plane-like shape.

A heat exchanger with this configuration above is easy to manufacture.

According to another aspect of any one of the heat exchangers mentioned above, a fin and pins extending backwardly from the inner surface of the front wall are formed on the front wall. The pins are arranged on the downstream side of the fin with respect to the flue gas flow direction. The fin and a part of the pins are arranged at the upper portion. The rest of the pins are arranged at the lower portion.

With the above configuration, the heat exchange efficiency and the durability of the heat exchanger against the heat can be improved at the same time.

It is more efficient for heat exchanging to put pins on the inner surface of the front wall. On the other hand, if pins are located too close to a burner in the combustion space, the pins can be easily damaged by overheating. Therefore, it is preferable to arrange the fins on the part of the inner surfaces of the walls which is close to the burner. However, pins are preferably used than the fins from the viewpoint of the heat exchange efficiency. In other words, a fin is preferably arranged in the area close to the burner, and has a suitable length along the flue gas flowing direction.

If only the fin is arranged on the inner surface of the upper portion, the lengths of the fin and the upper portion are restricted. However, in this aspect, the length of each of the front fin and the upper portion can be independently adjusted. Thereby, the design of the heat exchanger has more flexibility to achieve high efficiency in heat exchanging as well as high durability against heat.

According to another aspect of any one of the heat exchangers with the fin and the pins mentioned above, each of the pins has larger surface area per unit volume than the fin. The use of both pins and fins mentioned above can enhance the efficiency of heat exchanging by arranging pins and fins on the appropriate areas respectively.

DETAILED DESCRIPTION OF EMBODIMENT(S)

Preferred embodiments of the heat exchanger according to the present invention will be described with reference to the drawings.

It should be understood that the detailed explanation are provided merely for the purpose of explanation, and are in no way to be construed as limiting of the present invention. While the present invention will be described with reference to exemplary preferred embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention will be described herein with reference to preferred structures, materials and embodiments, the present invention is not intended to be limited to the particulars disclosed herein; rather, the present invention extends to all functionally equivalent structures, methods and uses, such as are within the scope of the appended claims.

Figure 1:
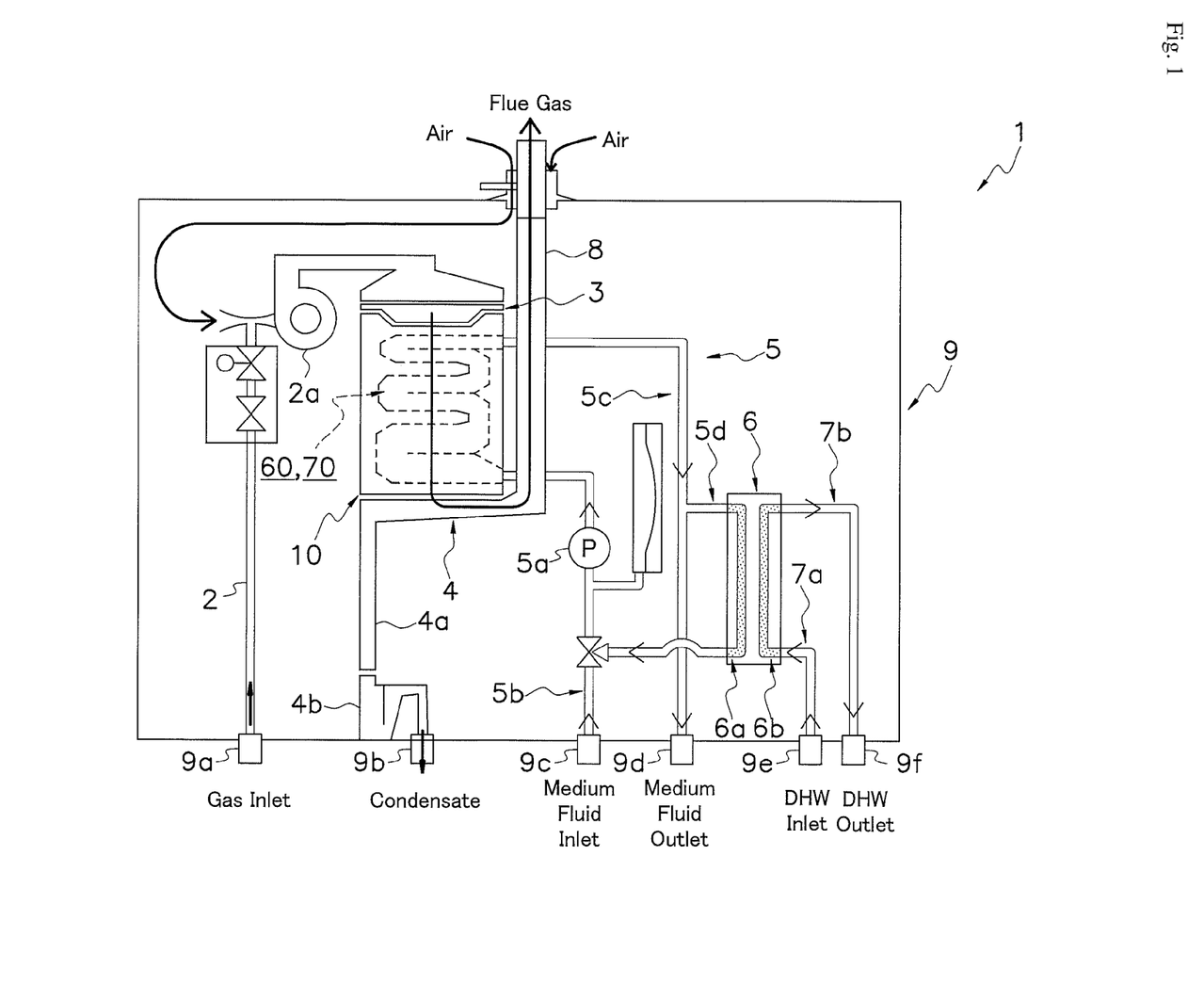
FIG. 1 is a schematic diagram of the heat exchange system equipped with the heat exchanger according to an embodiment of the present invention.

FIG. 1 shows a schematic diagram of a heat exchange system 1 equipped with a heat exchanger 10 according to a preferred embodiment of the present invention.

The heat exchange system 1 is used for heating medium fluid which is used for space heating and heating domestic water, while the heat exchange system 1 may be used only for heating the medium fluid for space heating or only for heating the domestic water.

As shown in FIG. 1, the heat exchange system 1 is mainly provided with the heat exchanger 10, a fan 2a, a burner 3, a siphon 4b, a pump 5a, a heat exchanger 6, and a housing 9. As shown in FIG. 1, the heat exchange system 1 has a gas inlet connector 9a to which a fuel gas supply pipe (not shown) is connected, a condensate outlet connector 9b to which a drain outlet pipe (not shown) is connected, medium fluid water inlet/outlet connectors 9c, 9d to which medium fluid inlet/outlet pipes (not shown) are respectively connected, and DHW (domestic heat water) inlet/outlet connectors 9e, 9f to which DHW inlet/outlet pipes (not shown) are respectively connected.

The housing 9 shown in FIG. 1 has a box-like-shape such as a cuboid shape. The housing 9 accommodates the heat exchanger 10, the fan 2a, the burner 3, the siphon 4b, the pump 5a, and the heat exchanger 6 as shown in FIG. 1.

The fan 2a intakes a fuel gas, such as natural gas, supplied from the fuel gas supply pipe (not shown) via the gas inlet connector 9a and a gas pipe 2 as shown in FIG. 1. The fan 2a also intakes air from the outside of the housing 9. The fan 2a then supplies the mixture gas with the fuel gas and the air to the burner 3.

Figure 3:
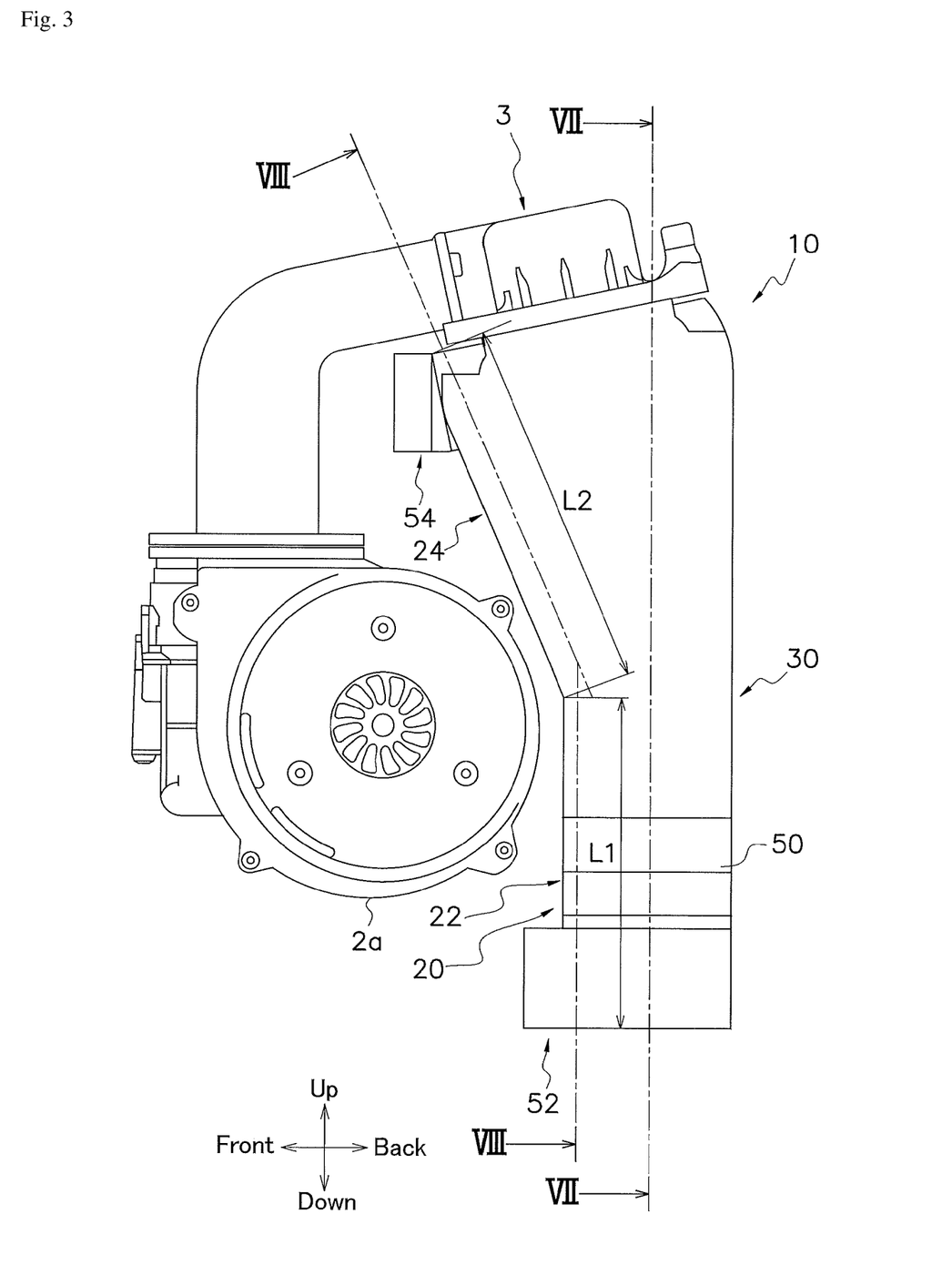
FIG. 3 is a side view of the heat exchanger on which the burner is mounted according to FIG. 1.
Figure 6:
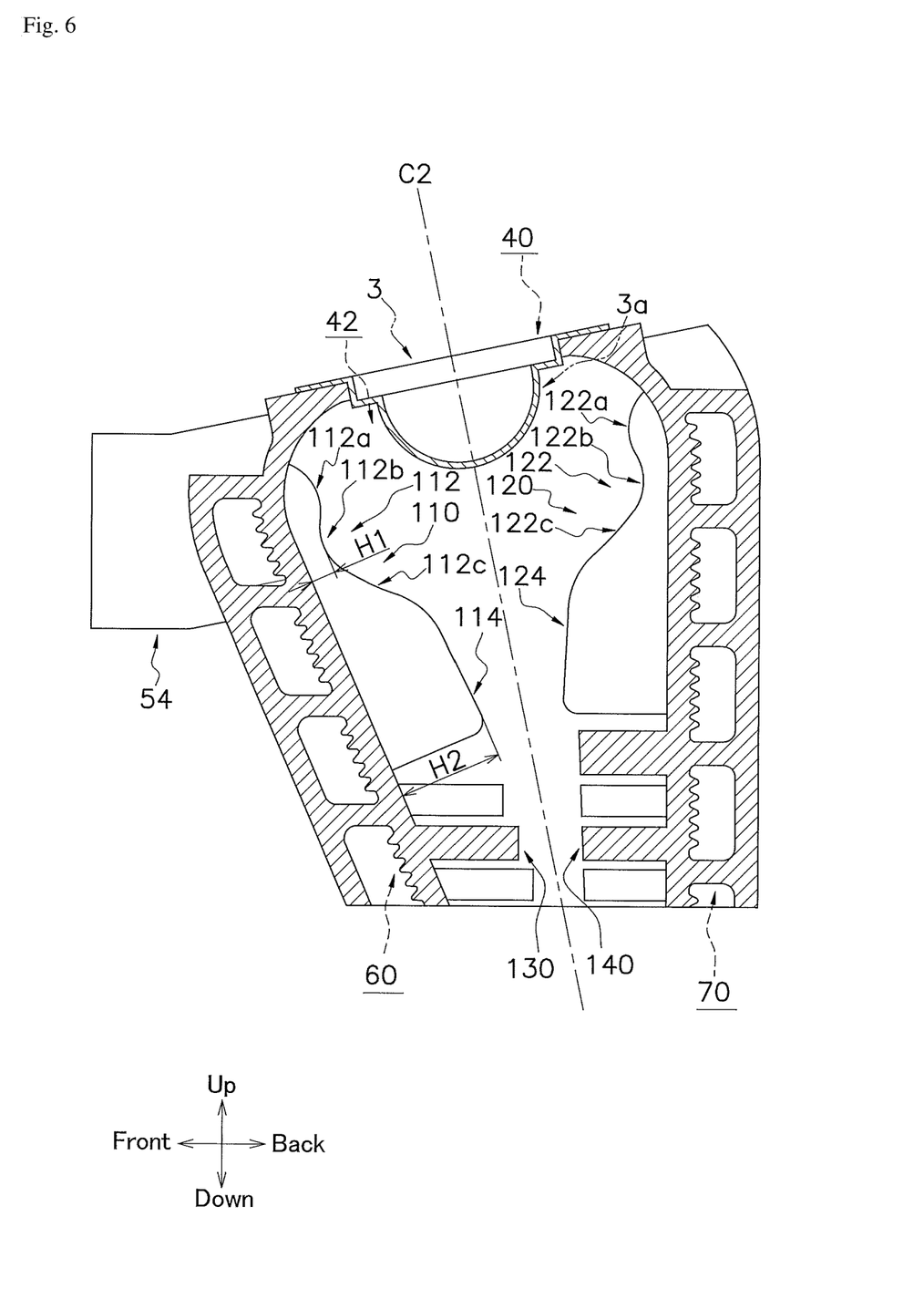
FIG. 6 is a cross section view of the heat exchanger viewing from the arrow direction of the VI-VI line of FIG. 4.

The burner 3 is mounted on the heat exchanger 10 as shown in FIG. 3. Specifically, the burner 3 is mounted on the top of the heat exchanger 10. A burner port 3a of the burner 3, from which flammable gas is injected, is arranged in a combustion space 42 formed in the heat exchanger 10 as shown in FIG. 6. The burner 3 injects the flammable gas (mixture gas with the fuel gas and the air) into the combustion space 42 and combusts the flammable gas in the combustion space 42.

Figure 5:
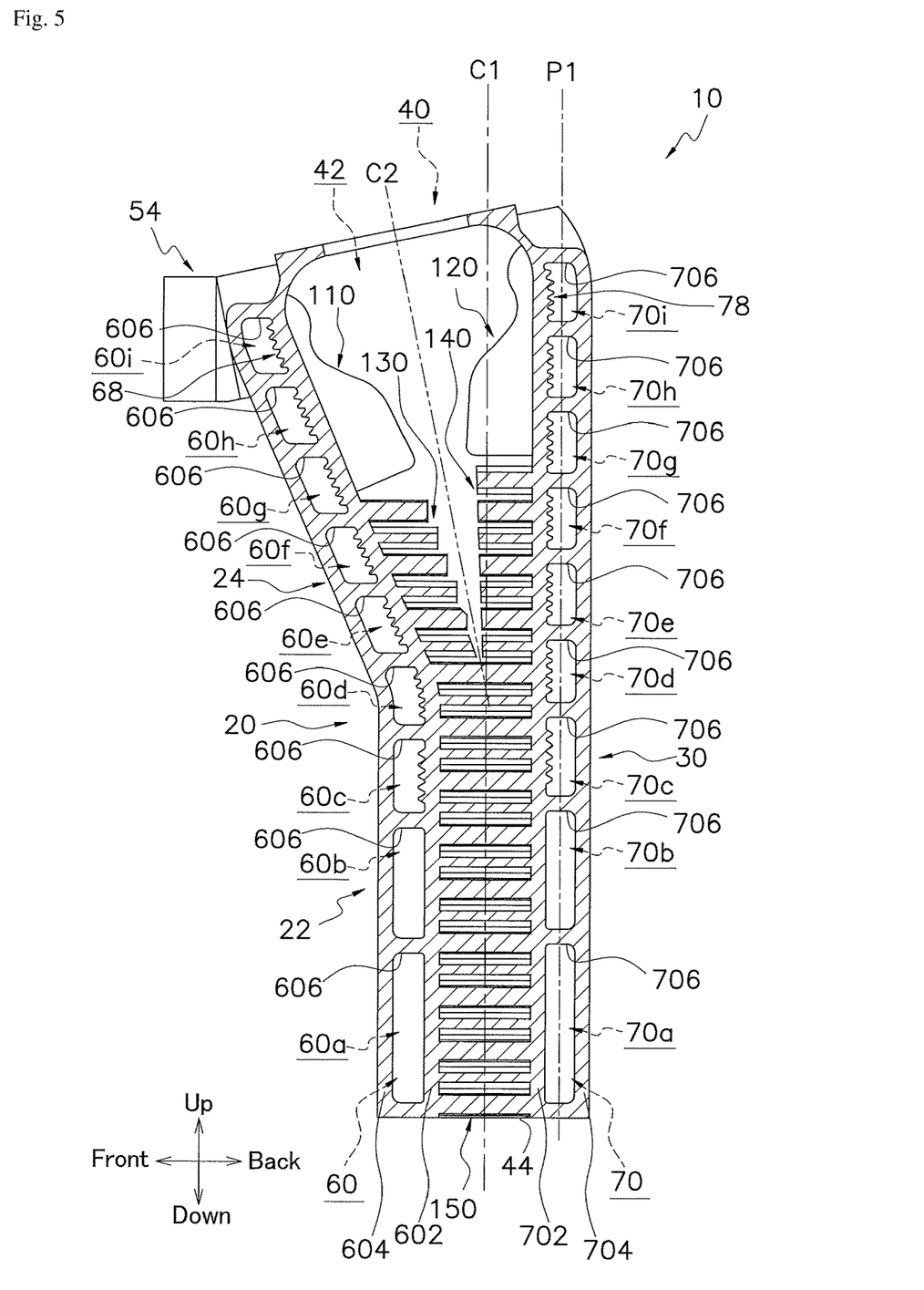
FIG. 5 is a cross section view of the heat exchanger viewing from the arrow direction of the V-V line of FIG. 4.

The heat exchanger 10 has a flue gas space 40 including the combustion space 42 and two channels 60, 70 as shown in FIG. 5. The heat exchanger 10 is configured such that the medium fluid in the two channels 60, 70 can exchange heat with the flue gas flowing in the flue gas space 40, in use.

As mentioned above, the burner port 3a of the burner 3 is arranged over the combustion space 42 and the flammable gas is combusted in the combustion space 42. Flue gas generated by the combustion of the flammable gas flows downward in the flue gas space 40.

The channels 60, 70 constitute a part of a medium fluid circuit 5 in which a medium fluid circulates. The medium fluid circuit 5 further includes an inlet pipe 5b, an outlet pipe 5c, and the medium fluid inlet/outlet pipes (not shown) which are arranged outside the heat exchange system 1 and are connected to the medium fluid water inlet/outlet connectors 9c, 9d. The medium fluid circuit 5 also includes space heating devices (not shown), such as floor heating devices and radiators, which are arranged outside the heat exchange system 1 and which are connected to the medium fluid outlet pipe and the medium fluid inlet pipe. For example, the medium fluid circulating in the medium fluid circuit 5 is an aqueous medium.

In the medium fluid circuit 5, the medium fluid is supplied to the medium fluid inlet connector 9c from the medium fluid inlet pipe (not shown). The medium fluid then flows in each of the channels 60, 70 from the inlet of each of the channels 60, 70 through the inlet pipe 5b. On the inlet pipe 5b, the pump 5a is arranged to circulate the medium fluid in the medium fluid circuit 5. In the heat exchanger 10, the medium fluid flows in the channels 60, 70 and exchanges heat with the flue gas flowing in the flue gas space 40. After passing through the channels 60, 70, the medium fluid in each of the channels 60, 70 flows out from an outlet of each of the channels 60, 70. The medium fluid then flows out to the medium fluid outlet pipe (not shown) through the outlet pipe 5c and the medium fluid outlet connector 9d and is sent to space heating devices (not shown) through the medium fluid outlet pipe.

The configuration of the heat exchanger 10 will be explained in detail later.

After the flue gas has passed through the flue gas space 40, the flue gas is exhausted out of the housing 9 though a gas duct 8. Condensate from the flue gas is collected at a drain collecting part 4 located below the heat exchanger 10. The drain collecting part 4 includes a drain pipe 4a. The end portion of the drain pipe 4a is connected to the siphon 4b. The siphon 4b allows the condensate from the flue gas to drain to the drain outlet pipe (not shown) which is connected to the condensate outlet connector 9b while preventing the release of the flue gas.

The medium fluid circuit 5 includes a connecting pipe 5d which connects the inlet pipe 5b and the outlet pipe 5c of the medium fluid circuit 5 via a medium fluid channel 6a formed in the heat exchanger 6. The connecting pipe 5d is configured so that the medium fluid can flow from the outlet pipe 5c to the inlet pipe 5b through the medium fluid channel 6a.

The heat exchanger 6 also has a domestic water channel 6b formed therein. An inlet pipe 7a of the domestic water is connected to an inlet of the domestic water channel 6b. An outlet pipe 7b of the domestic water is connected to an outlet of the domestic water channel 6b. The inlet pipe 7a of the domestic water is connected to DHW inlet connector 9e. The outlet pipe 7b of the domestic water is connected to DHW outlet connector 9f. The inlet/outlet pipes 7a, 7b of the domestic water are configured so that domestic water flows in the domestic water channel 6b from the inlet of the domestic water channel 6b, and flows out to the outlet pipe 7b from the outlet of the domestic water channel 6b after the domestic heat water passes through the domestic water channel 6b. In the heat exchanger 6, domestic heat water flowing in domestic water channel 6b exchanges heat with the medium fluid flowing the medium fluid channel 6a, in use.

The operation of the heat exchange system 1 is briefly explained.

Fuel gas is supplied via the gas inlet connector 9a. Fuel gas and air taken from the outside of the housing 9 are mixed. The mixture gas is supplied to the burner 3. The flammable gas (mixture gas) is injected into the combustion space 42 from the burner 3 and is combusted in the combustion space 42. Flue gas then flows downwardly in the flue gas space 40.

Medium fluid is circulated in the medium fluid circuit 5. During circulation, relatively low temperature medium fluid flows into the channels 60, 70 via medium fluid inlet connector 9c and the inlet pipe 5b. Medium fluid flowing in the channels 60, 70 exchanges heat with the flue gas in the flue gas space 40 in use. The medium fluid heated at the heat exchanger 10 flows out from the medium fluid outlet connector 9d through the outlet pipe 5c and is sent to the space heating devices (not shown). The heat of the medium fluid is used for the space heating devices and cooled medium fluid (the medium fluid taken its heat by the space heating devices) then returns to the heat exchange system 1. By changing the direction of the flowing direction of the medium fluid, the medium fluid heated at the heat exchanger 10 is sent to the heat exchanger 6 to heat the domestic water. The heated domestic water is sent to the usage point such as bath room and kitchen.

The flue gas flowing out of the flue gas space 40 is exhausted through the gas duct 8. The condensate from the flue gas is drained to the drain outlet pipe through the siphon 4b.

A heat exchanger 10 according to a preferred embodiment of the present invention will be described in detail.

Figure 2:
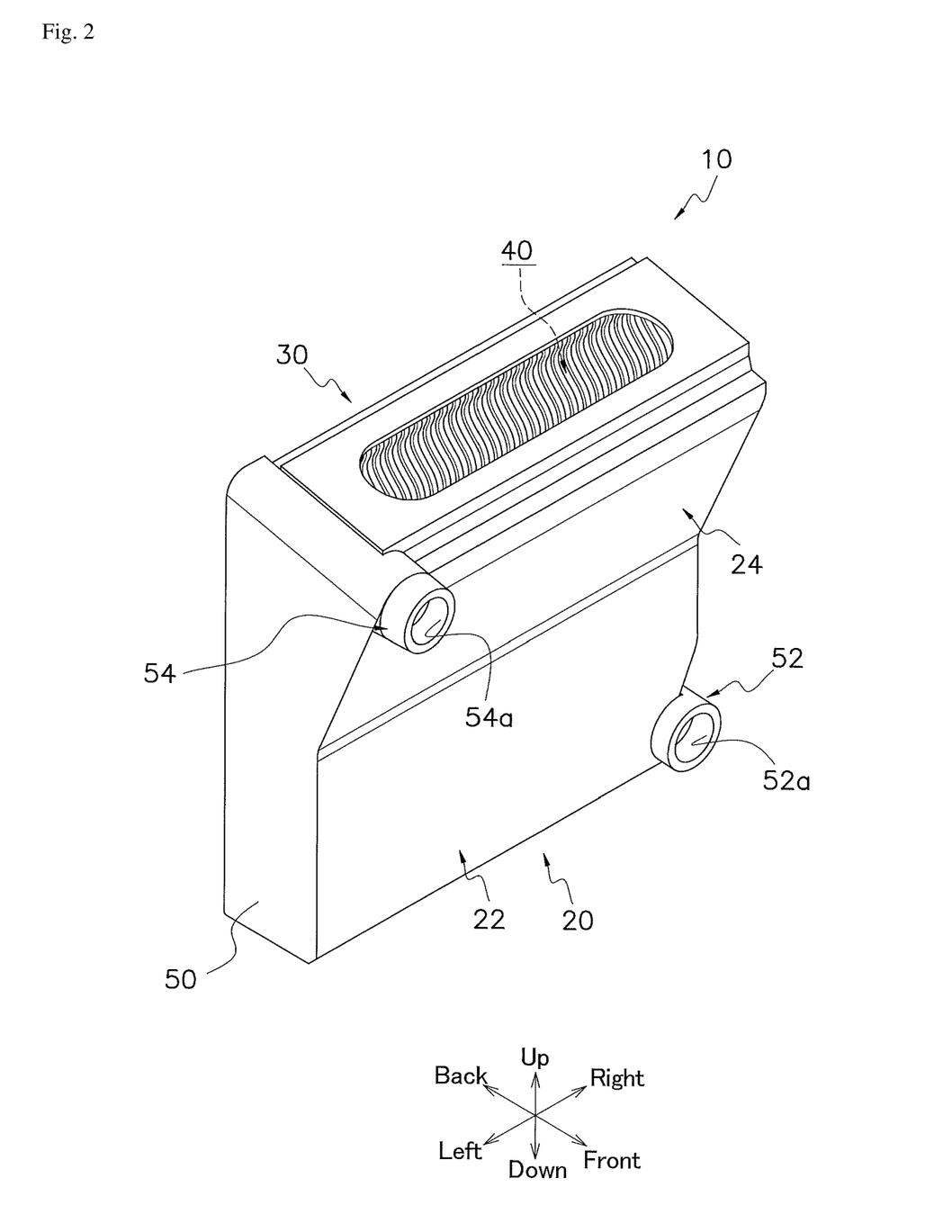
FIG. 2 is a perspective view of the heat exchanger according to FIG. 1.
Figure 4:
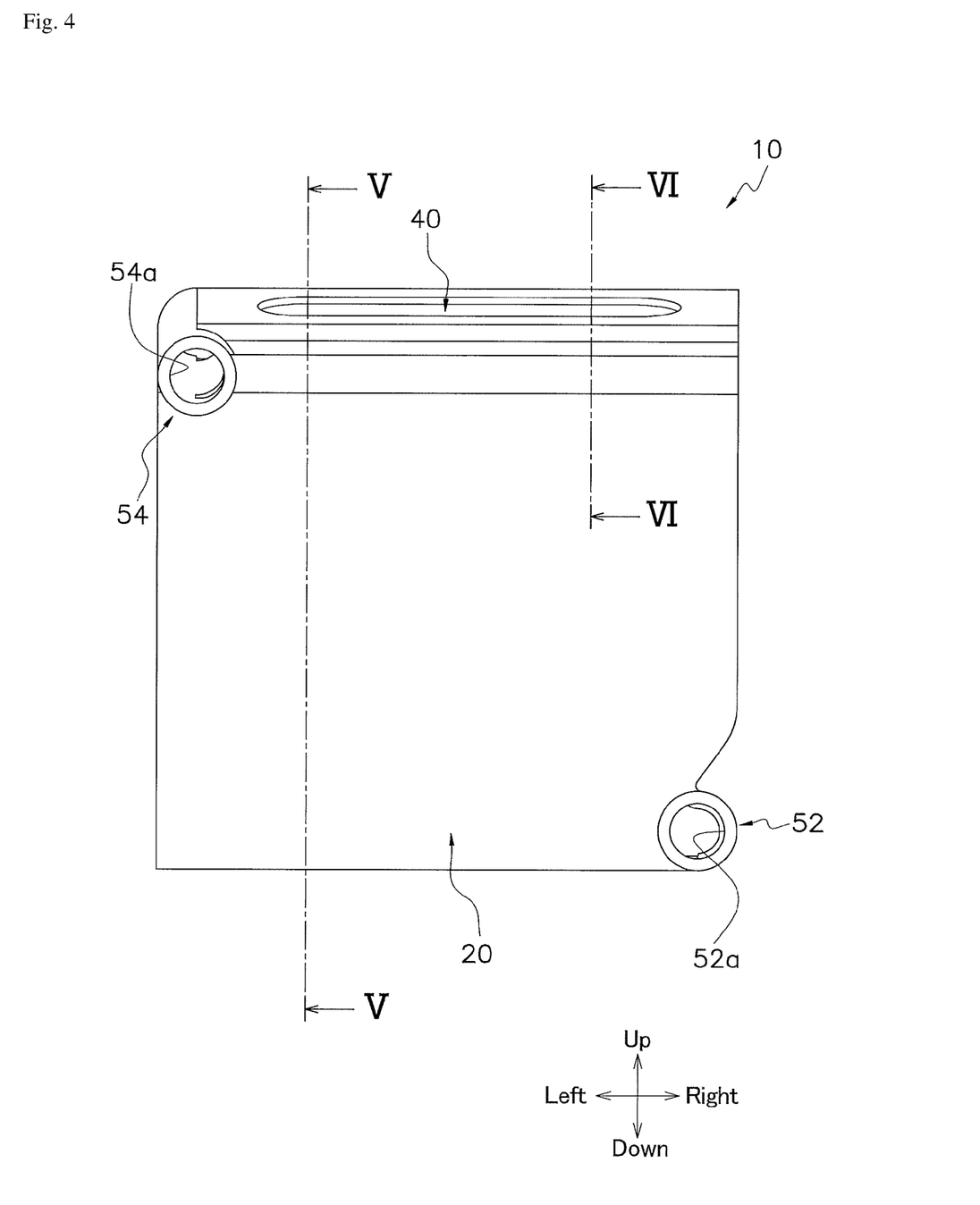
FIG. 4 is a front view of the heat exchanger according to FIG. 1.

FIG. 2 shows a perspective view of the heat exchanger 10. FIG. 3 shows a side view of the heat exchanger 10 on which the burner is mounted. FIG. 4 shows a front view of the heat exchanger 10.

The heat exchanger 10 is preferably manufactured by corrosion resistant metal such as aluminum alloy. For example, heat exchanger 10 is manufactured as monoblock sand-cast, although manufacturing method is not limited to this. The heat exchanger 10 is designed so that the burner 3 is mounted on the top of the heat exchanger 10 as shown in FIG. 3.

The heat exchanger 10 mainly includes a front wall 20, a back wall 30, side walls 50, an inlet distribution pipe 52, and an outlet converging pipe 54 as shown in FIG. 2.

The front wall 20 and the back wall 30 form a flue gas space 40 for a flue gas. The flue gas space 40 is formed by a space defined by the front wall 20, the back wall 30 and the side walls 50 which are attached to lateral ends of the front wall 20 and the back wall 30. The flue gas space 40 includes the combustion space 42 of the flammable gas. The combustion space 42, in which the burner port 3a of the burner 3 is installed, is arranged at the upper part of the flue gas space 40 as shown in FIG. 5. The flue gas flows downwardly in the flue gas space 40 from the combustion space 42 and flows out from an opening 44 arranged at the bottom of the heat exchanger 10, in use.

A front channel 60 is formed in the front wall 20 and a back channel 70 is formed in the back wall 30 as shown in FIG. 5. The medium fluid flows in the front channel 60 and back channel 70, in use.

The inlet distribution pipe 52 has a tube-shape which has an inlet opening 52a in the front side as shown in FIG. 4. The inlet pipe 5b of the medium fluid circuit 5 is connected at the inlet opening 52a. The inlet distribution pipe 52 is also connected to the inlets of each of the front channel 60 and the back channel 70. The inlet distribution pipe 52 is configured to distribute the fluid to the front channel 60 and the back channel 70, in use. The medium fluid flows into the front channel 60 and the back channel 70 through the inlet distribution pipe 52, in use.

The outlet converging pipe 54 has a tube-shape which has an outlet opening 54a in the front side as shown in FIG. 4. The outlet pipe 5c of the medium fluid circuit 5 is connected at the outlet opening 54a. The outlet converging pipe 54 is also connected to the outlets of each of the front channel 60 and the back channel 70. The outlet converging pipe 54 is configured to converge the fluid from the front channel 60 and the back channel 70, and output therefrom, in use. The converged medium fluid flows in the outlet pipe 5c of the medium fluid circuit 5, in use.

Now, the back wall 30 and the front wall 20 will be described in more detail.

The back wall 30 has a tabular shape. The back wall 30 extends along a first plane P1 as shown in FIG. 5. The heat exchanger 10 is arranged on a horizontal plane and the first plane P1 is a vertical plane in this embodiment, although the arrangement of the heat exchanger 10 is not limited to this. In the heat exchange system 1, the heat exchanger 10 is preferably accommodated such that the back wall 30 extends along one of the walls of the housing 9. Due to the shape of the back wall 30, a dead space between the back surface of the heat exchanger 10 and the inner surface of the wall of the housing 9 can be minimized.

The front wall 20 includes a lower portion 22 and an upper portion 24 as shown in FIG. 2. The lower portion 22 extends upwardly along the back wall 30 as shown in FIG. 3. In other word, the lower portion 22 of the front wall extends in parallel with the back wall 30. The lower portion 22 preferably has a plane-like shape. The upper portion 24 extends upwardly from the upper end of the lower portion 22 as shown in FIG. 3. More specifically, the upper portion 24 extends upwardly from the upper end of the lower portion 22 in a planar fashion. The upper portion 24 of the front wall 20 has a plane-like shape. Furthermore, the upper portion 24 extends outwardly away from the back wall 30 so as to form a combustion space 42 of a flammable gas between the upper portion 24 of the front wall 20 and the back wall 30. The length L2 of the upper portion 24 along the longitudinal direction thereof is preferably longer than the length L1 of the lower portion 22 along the longitudinal direction thereof as shown in FIG. 3. Each of the longitudinal direction of the upper portion 24 and the lower portion 22 is a direction along which each of the upper portion 24 and the lower portion 22 extends in side view.

The space formed under the upper portion 24 is effectively used for arranging elements of the heat exchange system 1 such as the fan 2a to achieve the downsizing of the housing 9 of the heat exchange system 1 as shown in FIG. 3. The space formed under the upper portion 24 may also be used for arranging the other elements of the heat exchange system 1 such as valve, pipe, and venturi device.

Figure 7:
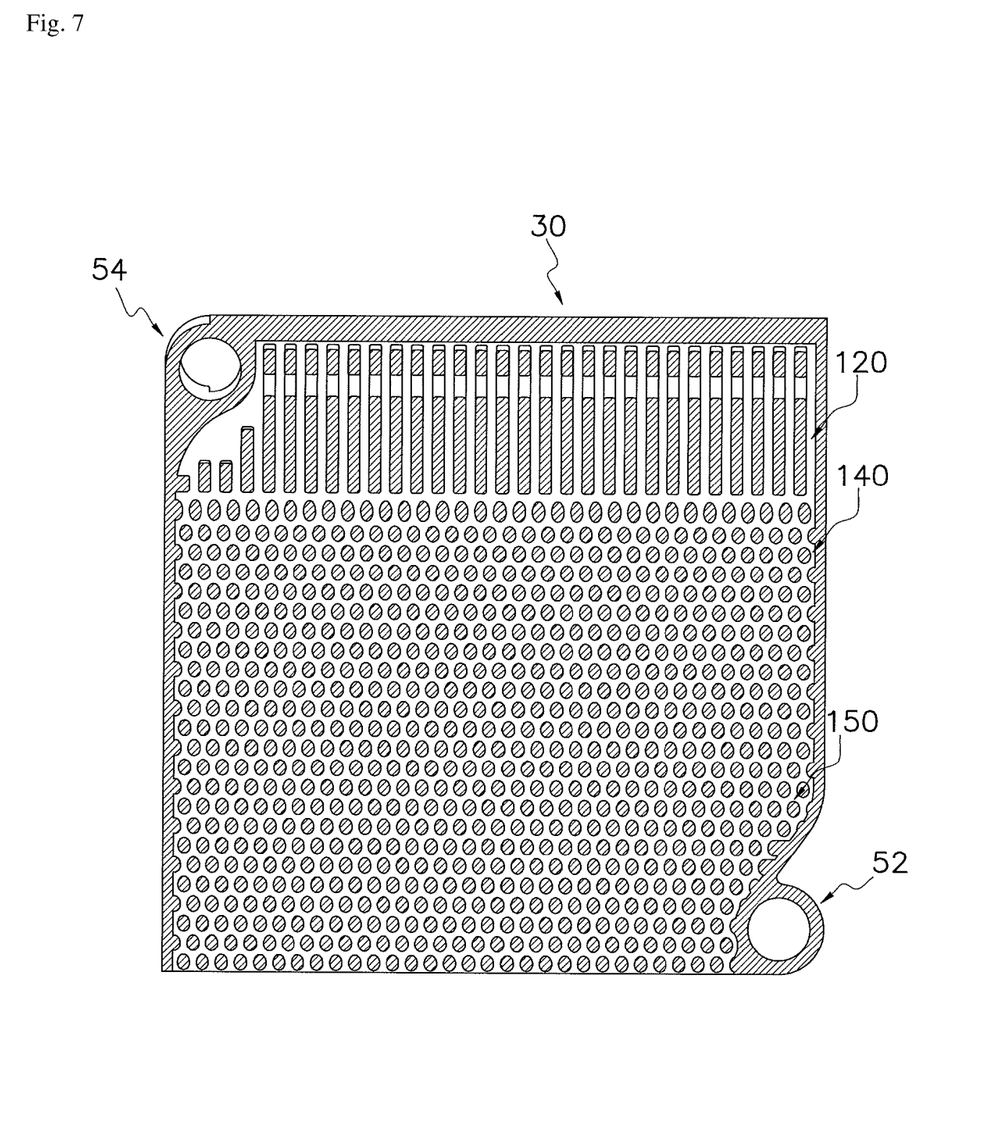
FIG. 7 is a cross section view of the heat exchanger viewing from the arrow direction of the VII-VII line of FIG. 3.

Next, the structures which are arranged on the inner surface of the front wall 20 and the inner surface of the back wall 30 will be described with reference to FIG. 5 to FIG. 7. The inner surface of the upper portion 24 is a surface which faces the back wall 30. The inner surface of the back wall 30 is a surface which faces the front wall 20.

FIG. 5 is a cross section view of the heat exchanger viewing from the arrow direction of the V-V line of FIG. 4. FIG. 6 is a cross section view of the heat exchanger viewing from the arrow direction of the VI-VI line of FIG. 4. FIG. 7 is a cross section view of the heat exchanger viewing from the arrow direction of the VII-VII line of FIG. 3.

The upper portion 24 of the front wall 20 is provided with front fins 110 as shown in FIG. 5. The front fins 110 are formed to protrude from the inner surface of the front wall 20. A plurality of the front fins 110 is arranged along the lateral direction (left-right direction) of the front wall 20 on the inner surface of the upper portion 24 at a predetermined interval. The number of the front fins 110 and the interval between the front fins 110 depend on the various factors such as the amount of heat transferred from the flue gas to the medium fluid, materials of the walls, and the power of the burner to be installed.

In addition to the front fins 110, the front wall 20 is provided with front pins 130, 150 as shown in FIG. 5. The front pins 130, 150 are arranged on the downstream side of the front fins 110 with respect to the flue gas flow direction. In other words, the front pins 130, 150 are arranged below the front fins 110. The cross-sectional of the front pins 130, 150 with respect to its main axis has a circular shape, or preferably an elliptic shape which is longer in the longitudinal direction than the lateral direction of the front wall. Each of the pins 130, 150 has larger surface area per unit volume than the front fins 110. The front pins 130, 150 extend backwardly from the inner surface of the front wall 20. A part of the front pins (pins 130) is arranged at the upper portion 24 of the front wall 20 below the front fins 110. A plurality of the front pins 130 is preferably arranged along the lateral direction (left-right direction) of the front wall 20 on the inner surface of the upper portion 24 at a predetermined interval. Several lines of the front pins 130 are preferably arranged at the upper portion 24 along the longitudinal direction at a predetermined interval. The rest of the front pins 150 are arranged at the lower portion 22 of the front wall. A plurality of the front pins 150 is arranged along the lateral direction (left-right direction) of the front wall 20 on the inner surface of the lower portion 22 at a predetermined interval. Several lines of the front pins 150 are arranged at the lower portion 22 along the longitudinal direction at a predetermined interval. The number of the front pins 130, 150, and the interval between the front pins 130, 150 depend on the various factors such as the amount of heat transferred from the flue gas to the medium fluid, materials of the walls, and the power of the burner to be installed.

The back wall 30 is provided with back fins 120 as shown in FIG. 5. The back fins 120 are formed to protrude from the inner surface of the back wall 30. A plurality of the back fins 120 is arranged along the lateral direction (left-right direction) of the back wall 30 on the inner surface of the back wall 30 at a predetermined interval as shown in FIG. 7. The number of the back fins 120 and the interval between the back fins 120 depend on the various factors such as the amount of heat transferred from the flue gas to the medium fluid, materials of the walls, and the power of the burner to be installed.

The number of the back fins 120 and the interval between the back fins 120 are preferably the same as those of the front fins 110. Each of the back fins 120 preferably corresponds to one of the front fins 110 such that the corresponding front and back fins face to each other. The front fin 110 and the corresponding back fin 120 are arranged symmetrically with respect to a virtual line C2 along which the flammable gas is to be injected into the combustion space 42 as shown in FIG. 5.

The shapes of the front fins 110 and the back fins 120 are described in detail with reference to FIG. 6.

Most of the front fins t 10 and the corresponding hack fins 120, except for fins 110, 120 arrange under the outlet converging pipe 54 (refer to FIG. 7), including respectively a first portion 112, 122 and a second portion 114, 124 arranged below the first portion 112, 122 as shown in FIG. 6. The height H1 of the first portion 112, 122 from the inner surface of the corresponding wall 20, 30 is smaller than the height H2 of the second portion 114, 124 from the inner surface of the corresponding wall 20, 30 as shown in FIG. 6.

Preferably, each of the fins 110, 120 includes the first portion 112, 122 and the second portion 114, 124.

Most of the front fins 110 and the corresponding back fins 120, except for fins 110, 120 arrange under the outlet converging pipe 54 (refer to FIG. 7), include an inwardly bulged portion 112a, 122a which bulges toward the virtual line C2 and an outwardly curved portion 112b, 122b which curves away from the virtual line C2 as shown in FIG. 6. The outwardly curved portion 112b, 122b is arranged below the inwardly bulged portion 112a, 122a as shown in FIG. 6.

The inwardly bulged portion 112a, 122a and the outwardly curved portion 112b, 122b are formed so as to keep a predetermined distance between the burner 3, more specifically the burner port 3a of the burner 3, to be installed on the heat exchanger 10 and the fin 110, 120. The predetermined distance depends on various factors such as the desired power of the burner 3 and the material of the fins 110, 120.

Preferably, each of the fins 110, 120 includes the inwardly bulged portion 112a, 122a and the outwardly curved portion 112b, 122b.

Each of the most of the front fins 110 and the corresponding back fins 120, except for fins 110, 120 arranged under the converging pipe 54 (refer to FIG. 7), has a tapered portion 112c, 122c where the height of the fin 110, 120 from the inner surface of the corresponding wall 20, 30 gradually decreases towards an upper end of the fin 110, 120 as shown in FIG. 6.

The tapered portion 112c, 122c is formed so as to keep a predetermined distance between the burner 3, more specifically the burner port 3a of the burner 3, to be installed in the heat exchanger 10 and the fin 110, 120. The predetermined distance depends on various factors such as the desired power of the burner 3 and the material of the fins 110, 120.

Preferably, each of the fins 110, 120 has the tapered portion 112c, 122c.

In addition to the back fins 120, the back wall 30 is provided with back pins 140, 150 as shown in FIG. 5. The cross-sectional of the back pins 140, 150 with respect to its main axis has a circular shape, or preferably an elliptic shape which is longer in the longitudinal direction than the lateral direction of the back wall 30. Each of the pins 140, 150 has larger surface area per unit volume than the back fins 120. The back pins 140, 150 extend forwardly from the inner surface of the back wall 30. A plurality of the back pins 140, 150 is arranged in the lateral direction (left-right direction) of the back wall 30 on the inner surface of the back wall 30 at a predetermined interval. Several lines of the back pins 140, 150 are arranged on the back wall 30 along the longitudinal direction at a predetermined interval. The number of the back pins 140, 150 and the interval between the back pins 140, 150 depend on the various factors such as the amount of heat transferred from the flue gas to the medium fluid, materials of the walls, and the power of the burner to be installed.

The front pins 150 arranged at the lower portion 22 of the front wall 20 are preferably connected to the corresponding back pins 150. In this embodiment, each of the pins 150 extends from the front wall 20 to the back wall 30. In other words, front pins 150 arranged at the lower portion 22 of the front wall 20 are integrated with the back pins 150.

The front pins 130 arranged at the upper portion 24 of the front wall 20 so as to face to the corresponding back pins 140. In other words the front pins 130 are arranged at the upper portion 24 of the front wall 20 is not connected to the corresponding the back pins 140 so as to make a space between them.

As explained above, the upper portion of the front wall 20 and the corresponding part of the back wall 30, which forms the combustion space 42 of heat exchanger 10 therebetween, is designed symmetrically with respect to the virtual line C2 which tilts against a virtual line C1. The lower portion 22 of the front wall 20 and the back wall 30 is arranged symmetrical with respect to the virtual line C1. With this configuration, flammable gas can be combusted under proper condition and the concentration of CO and NOx contained in the emission gas can be lowered.

Figure 8:
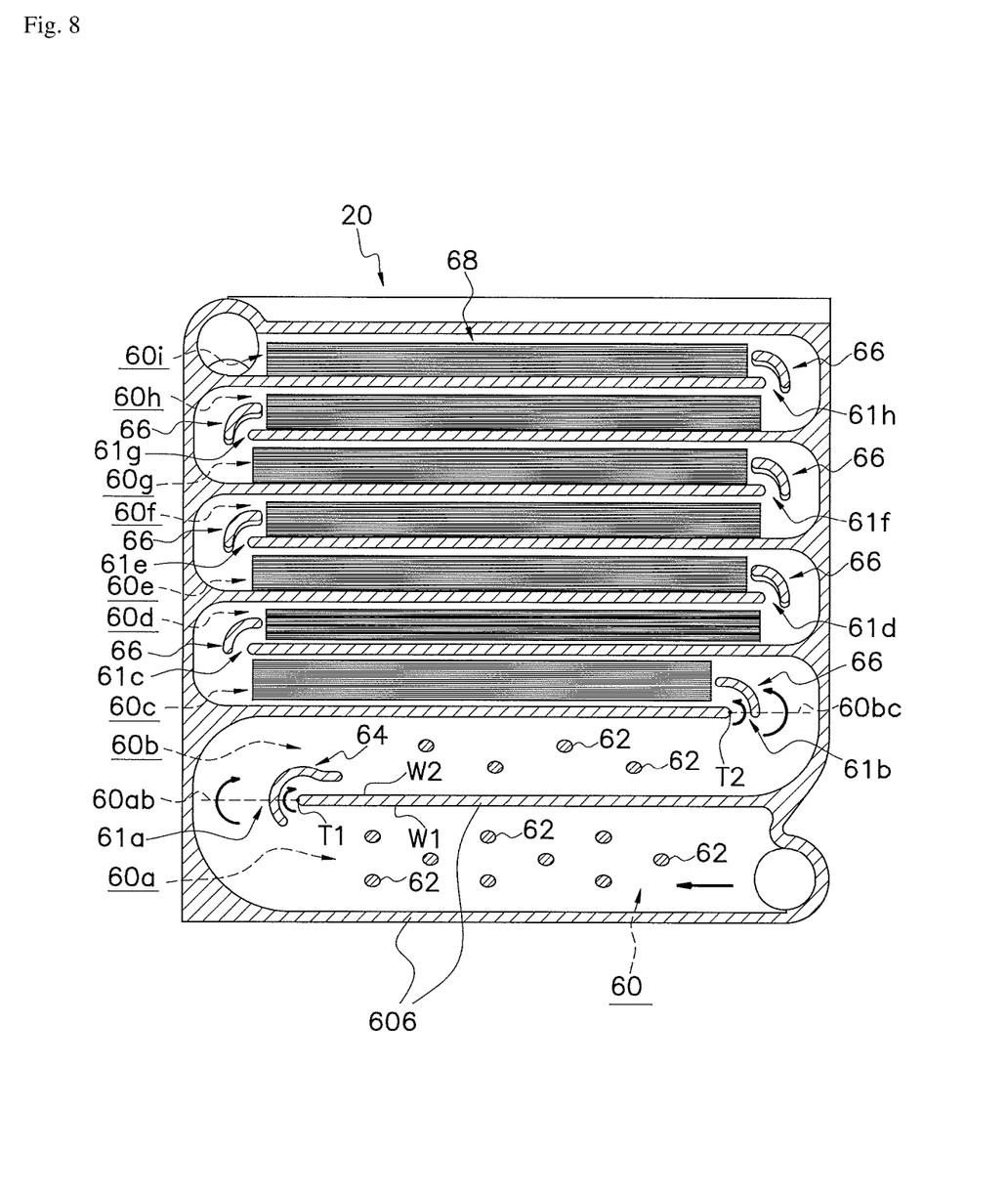
FIG. 8 is a cross section view of the heat exchanger viewing from the arrow direction of the VIII-VIII line of FIG. 3.

Next, the front channel 60 formed in the front wall 20 and the back channel 70 formed in the back wall 30 will be described in detail with reference to FIG. 5 and FIG. 8. FIG. 8 is a cross section view of the heat exchanger viewing from the arrow direction of the VIII-VIII line of FIG. 3.

The front wall 20 has an inside wall 602 and an outside wall 604 which face to each other and form the front channel 60 therebetween. The front wall 20 also has wall elements 606 which connect the inside wall 602 and the outside wall 604 and define the front channel 60. The back wall 30 has an inside wall 702 and an outside wall 704 which face to each other and form the back channel 70 therebetween. The back wall 30 has wall elements 706 which connect the inside wall 702 and outside wall 704 and define the back channel 70.

The front channel 60 includes straight portions 60*a*, 60*b*, 60*c*, 60*d*, 60*e*, 60*f*, 60*g*, 60*h*, and 60*i* which are arranged in substantially parallel to each other and are connected in series as shown in FIG. 8. The medium fluid supplied from the inlet of the front channel 60 flows the straight portions 60*a*, 60*b*, 60*c*, 60*d*, 60*e*, 60*f*, 60*g*, 60*h*, and 60*i* in this order and flows out from the outlet of the front channel 60. In this paragraph, parallel means that the two straight portions are connected with an angle such that the speed of the turning fluid in the channel drops to nearly zero on the inner side in the connecting area 61*a*, 61*b*, 61*c*, 61*d*, 61*e*, 61*f*, 61*g*, and 61*h*. For example, in the vicinity of an inner part T1 of a joint 60*ab* in the connected area 61*a* of the straight portions 60*a* and the straight portions 60*b*, the fluid nearly stops upon turning.

A plurality of pins 62 extending from the inside wall 602 is arranged in the straight portions 60*a*, 60*b* so as to improve the heat transfer efficiency between the medium fluid flowing in the straight portions 60*a*, 60*b* and the flue gas which flows along the inside wall 602. The straight portions 60*a*, 60*b* require higher strength against burst than the straight portions 60*c*-60*i* since than the straight portions 60*a*, 60*b* has the larger surface area compared with the straight portions 60*c*-60*i*. A plurality of pins 62 can also improve the strength against burst of the straight portions 60*a*, 60*b*. In the straight portions 60*c*-60*i*, a plurality of grooves 68 extending along the longitudinal direction of the straight portions 60*c*-60*i* is formed on the inside wall 602. Thereby the heat transfer area is increased between the medium fluid flowing in the straight portions 60*c*-60*i* and the flue gas which flows along the inside wall 602.

Preferably, the cross-sectional area of the straight portion 60*a* arranged on the most upstream side is larger than the cross-sectional area of the other straight portions 60*b*-60*i* arranged on downstream side with respect to the fluid flow as shown in FIG. 5.

The back channel 70 also includes straight portions 70*a*, 70*b*, 70*c*, 70*d*, 70*e*, 70*f*, 70*g*, 70*h*, and 70*i* as shown in FIG. 5. The straight portions 70*a*-70*i* are arranged in substantially parallel to each other and are connected in series. The medium fluid flowing from the inlet of the back channel 70 flows the straight portions 70*a*, 70*b*, 70*c*, 70*d*, 70*e*, 70*f*, 70*g*, 70*h*, and 70*i* in this order and flows out from the outlet of the back channel 70. In this paragraph, parallel has the same meaning with the previous paragraph for the front channel 60. In a manner similar to the above, a plurality of pins (not shown) extending from the inside wall 702 is arranged in the straight portions 70*a*, 70*b* and a plurality of grooves 78 extending along the longitudinal direction of the straight portions 70*c*-70*i* are formed on the inside wall 702 in the straight portions 70*c*-70*i*. The cross-sectional area of the straight portion 70*a* arranged on the most upstream side is larger than the cross-sectional area of the other straight portions 70*b*-70*i* arranged on downstream side with respect to the fluid flow.

The front channel 60 is further explained with reference to FIG. 8.

In the front channel 60, stagnation prevention means 64, 66 are preferably arranged in each of the connecting area 61*a*-61*h* of the straight portions 60*a*-60*i* as shown in FIG. 8. The stagnation prevention means 64, 66 connects the inside wall 602 and the outside wall 604 of the front wall 20.

In this embodiment, stagnation prevention means 64, 66 are arranged in each of the connecting area 61*a*-61*h* of the straight portions 60*a*-60*i*, but it is not limited to this configuration. It is preferable that at least the first stagnation prevention means 64 is arranged in the connecting area 61*a* of the straight portions 60*a* and the straight portion 60*b* which locates on the most upstream side in the channel 60 with respect to a fluid flow.

The first stagnation prevention means 64 is arranged in the connecting area 61*a* of the straight portions 60*a* and the straight portion 60*b* which locates on the most upstream side in the channel 60 with respect to the fluid flow. The first stagnation prevention means 64 is arranged in the vicinity of the inner part T1 of the joint 60*ab* of the straight portions 60*a*, 60*b* around which the fluid is to turn as shown in FIG. 8. The first stagnation prevention means 64 is formed in a hook-like shape when seen from the direction perpendicular to the front wall 20 as shown in FIG. 8.

At least one or more second stagnation prevention means 66 are preferably arranged in the connecting area 61b-61h of the straight portions 60b-60i in the channel 60. In other words, the second stagnation prevention means 66 are arranged in the connecting areas other than the connecting area 61a which locates on the most upstream side in the channel 60 with respect to the fluid flow. The second stagnation prevention means 66 are formed in an arc-like shape when seen from the direction perpendicular to the front wall 20 as shown in FIG. 8. The arc-like shaped second stagnation prevention means 66 are arranged in the front channel 60 such that the arc-like shaped surface is substantially along the fluid flow.

Each of the second stagnation prevention means 66 is arranged in the vicinity of an inner part of a joint of the straight portions 60b-60i around which the fluid is to turn. For example, one of the second stagnation prevention means 66 is arranged in the vicinity of an inner part T2 of a joint 60bc of the straight portions 60b, 60c around which the fluid is to turn as shown in FIG. 8.

The first stagnation prevention means 64 is arranged so as to partially surround the inner part T1 of the joint 60ab of the straight portions 60a, 60b around which the fluid is to turn when seen from the direction perpendicular to the wall 20 as shown in FIG. 8. Specifically the first stagnation prevention means 64 is preferably arranged so as to surround the inner part T1 of the joint 60ab of the straight portions 60a, 60b over an angle range of more than 90 degrees, and more preferably over an angle range of more than 180 degrees when seen from the direction perpendicular to the wall 20 as shown in FIG. 8.

The one or more second stagnation prevention means 66 are also arranged so as to partially surround the inner part of the joint of the straight portions around which the fluid is to turn when seen from the direction perpendicular to the wall 20 as shown in FIG. 8. For example, the second stagnation prevention means 66 are arranged so as to partially surround the inner part T2 of the joint 60bc of the straight portions 60b, 60c around which the fluid is to turn when seen from the direction perpendicular to the wall 20 as shown in FIG. 8. The second stagnation prevention means 66 are arranged so as to surround the inner part T2 of the joint 60bc of the straight portions 60b, 60c over an angle range of more than 90 degrees when seen from the direction perpendicular to the wall 20.

Figure 9:
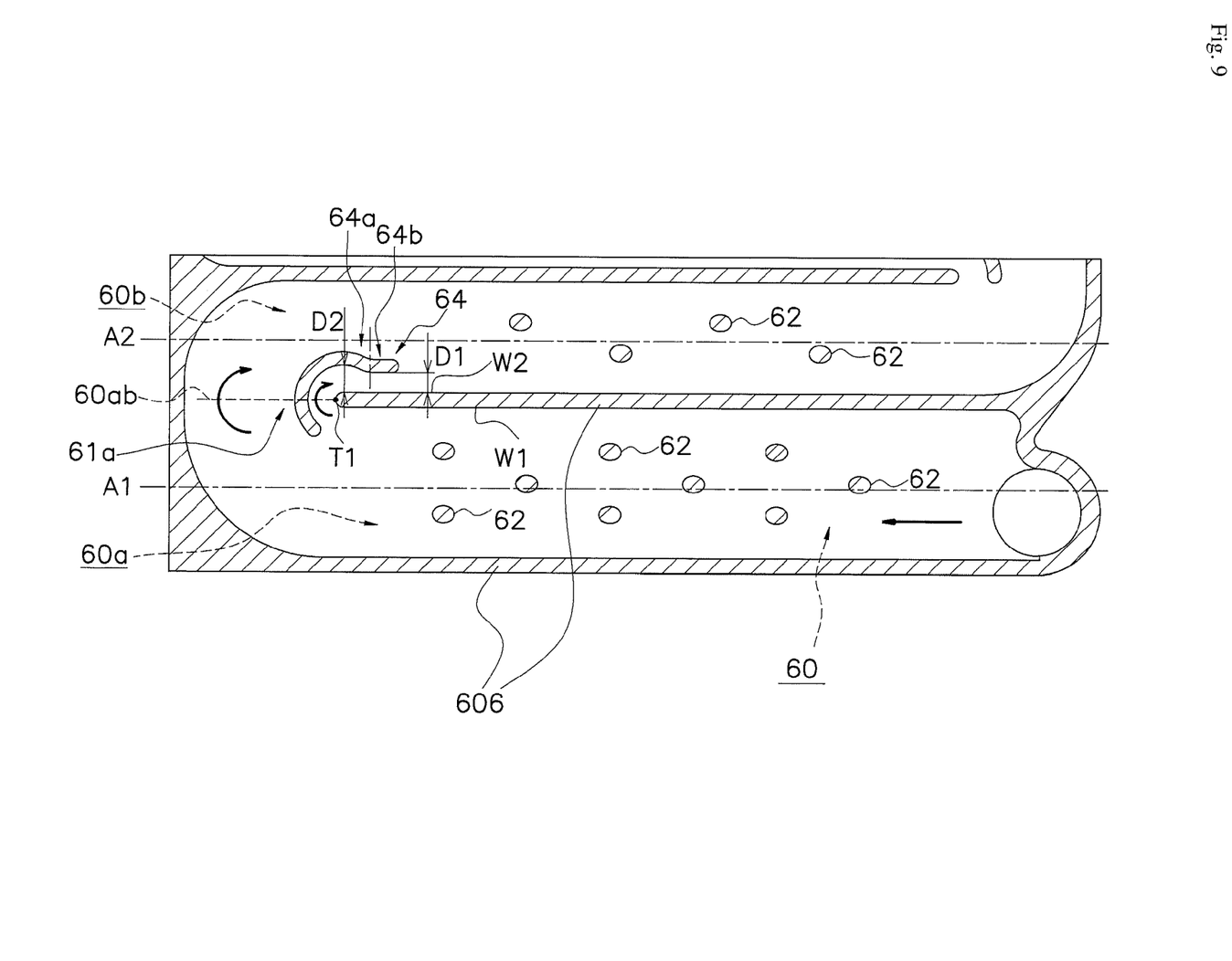
FIG. 9 is a partial enlarged view of FIG. 8.

The wall elements 606 which connects the inside wall 602 and the outside wall 604 include extending wall elements W1, W2 which respectively extend along the main axis A1, A2 of the straight portion 60a, 60b. The wall elements W1, W2 extend from the inner part T1 of the joint 60ab of the straight portions 60a, 60b around which the fluid is to turn as shown in FIG. 9. The main axes A1, A2 are axes along which the straight area of the straight portion 60a, 60b extends. The first stagnation prevention means 64 includes a first portion 64a which is arranged on the upstream side and a second portion 64b which is arranged on the downstream side with respect to the fluid flow as shown in FIG. 9. A maximum distance D1 between the second portion 64b and the extending wall element W2 is shorter than a maximum distance D2 between the first portion 64a and the extending wall element W2. The distance between the second portion 64b and the extending wall element W2 may be almost equal at any points.

The first stagnation prevention means 64 is arranged in the connecting area 61a in the straight portion 60b which is located on the downstream side among the two straight portions 60a, 60b connected. Each of the straight portions 60a, 60b has a straight area which has a straight tube-like shape. The first stagnation prevention means 64 is arranged to extend from the connecting area 61a into part of the straight area in the straight portion 60b. The first stagnation prevention means 64 may extend into the connecting area 61a located in the straight portion 60a at the upstream side with respect to the fluid flow.

The second stagnation prevention means 66 are arranged in the straight portion which is located at the downstream side with respect to the fluid flow among the straight portions connected. More specifically, the second stagnation prevention means 66 are arranged in the connecting area in the straight portion which is located on the downstream side among the two straight portions connected. Each of the straight portions 60c-60i has a straight area which has a straight tube-like shape. The second stagnation prevention means 66 may be arranged to extend from a connecting area into the straight area of the straight portion located on the downstream side.

The front channel 60 is explained above in detail with reference to FIG. 8. To avoid the redundancy of the explanation, the explanation of the back channel 70 is omitted regarding the common feature between the front channel 60 and the back channel 70. Only the difference between the front channel 60 and the back channel 70 will be explained below.

The heat transfers on the side of the front wall 20 and the side of the back wall 30 have different characteristic because of the unsymmetrical design of the walls. Specifically, the medium fluid in the front channel 60 of the front wall 20 can obtain more heat from the flue gas than the medium fluid in the back channel 70 of the back wall 30. However, the heat exchanger 10 is configured such that the temperature of the medium fluid at each outlet of each channel 60, 70 is substantially the same, in use.

The heat exchanger 10 is therefore configured such that the volume flow rate and/or mass flow rate of the fluid in the front channel 60 is greater than the back channel 70, in use. It is preferable that the heat exchanger 10 is configured such that at least the mass flow rate of the fluid in the front channel 60 is greater than the back channel 70, in use. Volume flow rate means the volume of fluid which passes per unit time. Mass flow rate means mass of a fluid which passes per unit of time. The volume flow rate and mass flow rate of the fluid in the front channel 60 is greater than the back channel 70 means that the average volume flow rate and average mass flow rate of the fluid in the front channel 60 is greater than the back channel 70. Average volume/mass flow rate means volume/mass flow over the entire front or back channel 60, 70. Volume/mass flow rate is generally measured at the inlet/outlet of each channel 60, 70.

To achieve this, the back channel 70 is configured to have a higher fluid resistance than the front channel 60.

Preferably, the minimum cross section in the back channel 70 is smaller than the minimum cross section in the front channel 60 with respect to cross sections intersecting with the direction of the fluid flow.

Preferably, an average cross-sectional area of the back channel 70 is smaller than the an average cross-sectional area of the front channel 60 with respect to cross sections intersecting with the direction of the fluid flow.

The front channel 60 includes a plurality of the straight portions 60a-60i as front sub channels which are arranged in substantially parallel to each other and are connected in series. The back channel 70 includes a plurality of the straight portions 70a-70i as back sub channels which are arranged in substantially parallel to each other. The straight portions 70a-70i are connected in series, and each of which faces to one of the straight portions 60a-60i. With respect to cross sections intersecting with the direction of the fluid flow, at least one of the straight portions 70a-70i has a minimum cross section smaller than a minimum cross section of the corresponding straight portions 60a-60i and/or an average cross-sectional area smaller than an average cross-sectional area of the corresponding straight portions 60a-60i.

Preferably, each of the straight portions 70a-70i has a minimum cross section smaller than a minimum cross section of the corresponding straight portions 60a-60i and/or an average cross-sectional area smaller than an average cross-sectional area of the corresponding straight portions 60a-60i.

The volume of the entire back channel 70 is smaller than the volume of the entire front channel 60.

The present invention is not limited to the above described embodiments, and various variations and modifications may be possible without departing from the scope of the present invention.

The invention claimed is:

1. A heat exchanger comprising:
a front wall; and
a back wall forming a flue gas space together with the front wall such that a fluid flowing through a channel formed in the front and back walls can exchange heat with flue gas in the flue gas space, in use,
the front wall including
a lower portion extending along the back wall, and
an upper portion extending upwardly from an upper end of the lower portion and outwardly away from the back wall to form a combustion space of a flammable gas between the upper portion and the back wall,
a length of the upper portion along a longitudinal direction thereof is longer than a length of the lower portion along a longitudinal direction thereof, and
an entirety of the back wall extending upwardly along a same direction of the lower portion of the front wall.

2. The heat exchanger according to claim 1, wherein the upper portion of the front wall is plane shaped.

3. The heat exchanger according to claim 2, wherein the lower portion of the front wall is plane shaped.

4. The heat exchanger according to claim 2, wherein
a fin and pins extending backwardly from an inner surface of the front wall are formed on the front wall, the fin having a varying thickness as measured perpendicularly relative to the back wall,
the pins are arranged on a downstream side of the fin with respect to a flue gas flow direction,
the fin and some of the pins are arranged at the upper portion, and
a remainder of the pins are arranged at the lower portion.

5. The heat exchanger according to claim 1, wherein the lower portion of the front wall is plane shaped.

6. The heat exchanger according to claim 3, wherein
a fin and pins extending backwardly from an inner surface of the front wall are formed on the front wall, the fin having a varying thickness as measured perpendicularly relative to the back wall,
the pins are arranged on a downstream side of the fin with respect to a flue gas flow direction,
the fin and some of the pins are arranged at the upper portion, and
a remainder of the pins are arranged at the lower portion.

7. The heat exchanger according to claim 1, wherein
a fin and pins extending backwardly from an inner surface of the front wall are formed on the front wall, the fin having a varying thickness as measured perpendicularly relative to the back wall,
the pins are arranged on a downstream side of the fin with respect to a flue gas flow direction,
the fin and some of the pins are arranged at the upper portion, and
a remainder of the pins are arranged at the lower portion.

8. A heat exchanger comprising:
a front wall; and
a back wall forming a flue gas space together with the front wall such that a fluid flowing through a channel formed in the front and back walls can exchange heat with flue gas in the flue gas space, in use,
the front wall including
a lower portion extending along the back wall, and
an upper portion extending upwardly from an upper end of the lower portion and outwardly away from the back wall to form a combustion space of a flammable gas between the upper portion and the back wall,
a length of the upper portion along a longitudinal direction thereof is longer than a length of the lower portion along a longitudinal direction thereof,
a fin and pins extending backwardly from an inner surface of the front wall being formed on the front wall, the fin having a varying thickness as measured perpendicularly relative to the back wall,
the pins being arranged on a downstream side of the fin with respect to a flue gas flow direction,
the fin and some of the pins being arranged at the upper portion, and
a remainder of the pins being arranged at the lower portion.

9. A heat exchanger according to claim 8, wherein each of the pins has a larger surface area per unit volume than the fin.

* * * * *